July 19, 1932.  C. A. RUPP  1,868,118
LUBRICATING DEVICE FOR BEARINGS ON A SHAFT
Original Filed Feb. 26, 1929

Inventor
Carl A. Rupp
by Hazard and Miller
Attorneys

Patented July 19, 1932

1,868,118

UNITED STATES PATENT OFFICE

CARL A. RUPP, OF LOS ANGELES, CALIFORNIA, ASSIGNOR TO COMMERCIAL IRON WORKS OF LOS ANGELES, OF LOS ANGELES, CALIFORNIA, A CORPORATION OF CALIFORNIA

LUBRICATING DEVICE FOR BEARINGS ON A SHAFT

Original application filed February 26, 1929, Serial No. 342,694. Divided and this application filed March 12, 1930. Serial No. 435,283.

My invention pertains to a lubricating device for bearings on a shaft.

An object of my invention is a device which may be utilized to secure proper lubrication of the various bearings on a shaft when there are more than one of such bearings and in which the lubricant is fed axially through the shaft. With my invention the device may be applied to either stationary or rotating shafts in which the shafts may rotate in bearings to be lubricated or with a stationary shaft with which some mechanism rotates on the shaft and requires lubrication.

It has been found that where a lubricant is forced longitudinally through a bore in a shaft and through a plurality of openings to bearings, that the lubrication is sometimes unequal, or not distributed in the manner required. For instance, if one bearing should be loose and another tight, the bulk of the lubricant will be pressed outwardly through the loose bearing and a right bearing will receive insufficient lubricant. An object therefore of my invention is a device and method of lubricating bearings on a shaft by forcing the lubricant axially through such shaft and lubricating one bearing at a time where there are a plurality of such bearings, also in choosing or selecting which particular bearing shall be lubricated.

A still further object of my invention is providing a shaft having an axial bore with ducts extending radially or in an outward direction from such bore to the surface of the shaft in order to lubricate bearings, and in this bore I insert a grease tube which may be reciprocated longitudinally of the shaft and hence of the bore. The grease tube is provided with ports which may be aligned with the various ducts to the bearings selectively and when one port is aligned with a duct, the other ports are closed by the walls of the shaft and hence the grease which is forced longitudinally through the grease tube can only be expelled through the port which is aligned with one of the grease ducts and hence only one bearing lubricated at a time.

Another detail feature of my invention is mounting the grease tube on the shaft in such a manner that such tube rotates with the shaft when such shaft has a rotation.

My invention herein illustrated is a division of my patent application Serial No. 342,694, for a drive and control for printing presses, filed February 26, 1929, and again another object and feature of my invention is a center lubricating device by means of which the two clutch bearings can be lubricated from the outer extreme end of the clutch or drive shaft.

My invention is illustrated in connection with the accompanying drawing, in which, Fig. 1 is a longitudinal section of one of the shafts illustrated in my patent application above mentioned, showing the mounts for a rotary shaft and indicating in dotted lines the bearings to be lubricated;

Figure 1:
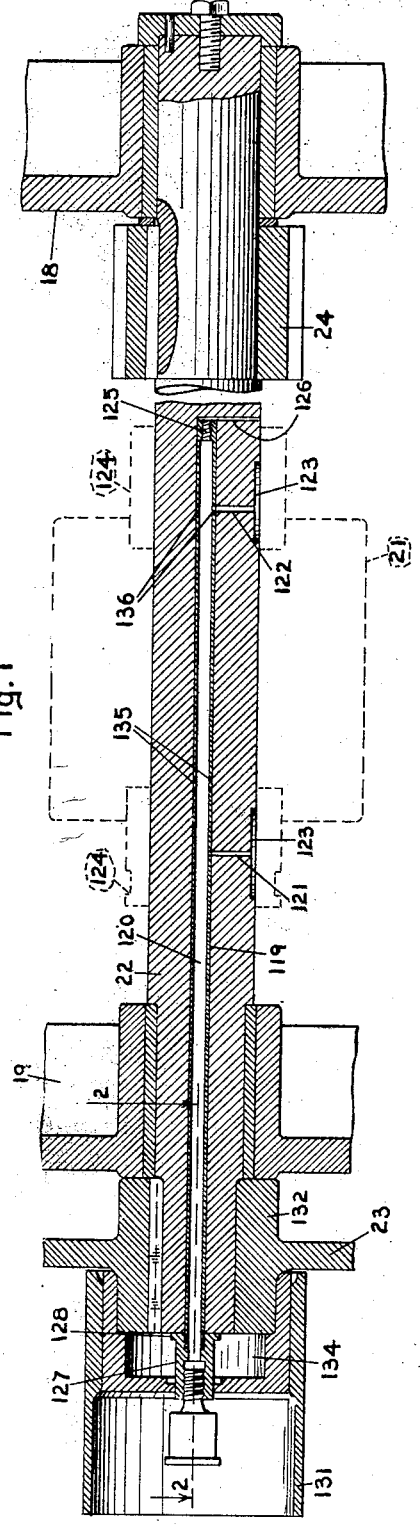
Figure 4:
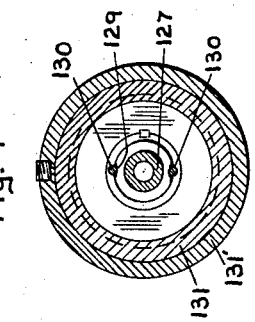
Fig. 4 is a transverse section on the line 4—4 of Fig. 2 in the direction of the arrows.
Figure 3:
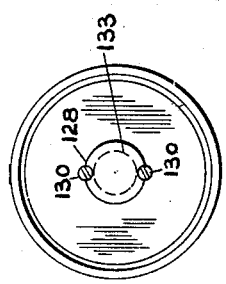
Fig. 3 is an end elevation taken in the direction of the arrow 3 of Fig. 2.
Figure 2:
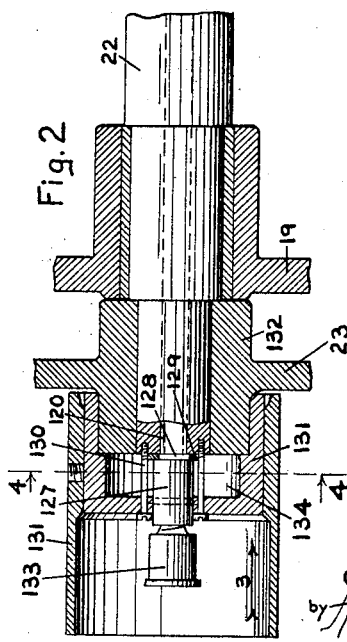
Fig. 2 is a detail horizontal section partly in elevation, showing the shaft in elevation, taken on the line 2—2 of Fig. 1 in the direction of the arrows.

In regard to the illustrations, the shaft is designated by the numeral 22, a portion of the frame of the printing press and a portion of the main panel thereof are designated by the numeral 18' and a stand located in front or to one side of this panel by the numeral 19. The shaft 22 is mounted in bearings in the panel and the frame and such shaft is indicated as having a fly wheel 23 on the outside of the stand 19 and a pinion 24 keyed thereon adjacent the panel 18'.

The clutches indicated in my prior application designated by the numeral 21 are indicated dotted in Fig. 1, and in the illustration there are the bearings of the clutches which are to be lubricated. In order to selectively lubricate the bearings of either the upper or lower clutches, I utilize the construction illustrated in Figs. 1 to 4, which may be considered as operating either in connection with the shaft 22. The shaft has a longitudinal bore 119 which has a reciprocal grease tube 120 mounted therein. There are lateral transverse grease ducts 121 and 122 from the bore 119 and these lead into longitudinal grooves 123 to the clutch bearings indicated in 124.

A closure plug 125 is fitted in the inner end of the tubing 120 and there is a bleeder duct 126 leading from the end of the bore 119 to the surface of the shaft. The outer end of the grease tube 120 has a coupling 127 mounted thereon, preferably being screw threaded. This coupling has a flange 128 with grooves 129 in its periphery which grooves are engaged by studs 130 screwed into the end of the shaft and through a cap disc 131, this cap disc being illustrated as fitting over the hub 132 of one of the fly wheels. By this construction the coupling 127 is forced to rotate with the shaft and hence the grease tube also rotates with the shaft and cannot rotate relatively thereto. The sleeve 131 mounted on the cap 131 is to protect the operators from having their clothing caught in the rotating grease cup.

A grease cup 133 is secured to the end of the coupling 127 and by pulling out on the grease cup the coupling may be slid outwardly through the space 134 between the cap disc 131 and end of fly wheel hub, thereby pulling the grease tube 120 and shifting the port 135 to a register with grease duct 121 and the port 136 out of register with grease duct 122. In this position grease may be forced into the outer clutch bearing nearest the stand 19. In a similar manner, when the grease cup is pushed upon to its innermost position as shown in Fig. 1, the grease port 136 will come to register with grease duct 122 and the port 135 will come out of register with duct 121 and make it possible to force grease into the remote bearing of clutch.

The bleeder duct 126 serves as an escape for any grease that may collect between end of tube 120 when pulled out and end of bore 119 which would hamper getting tube back to its inner position.

From the above construction and description it will be seen that when my invention is applied to a rotary shaft, that a plurality of bearings may be selectively lubricated, such bearings being situated longitudinally of the shaft. It is likewise apparent that the same system of lubrication will apply to a stationary shaft on which devices rotate, of which the bearings are to be lubricated. While in the illustration I have indicated only two bearings to be lubricated selectively, it is quite apparent that a larger number may be lubricated in the same manner by having a duct to each of the bearings from the central boring shaft and having ports in the same grease tube to align with such ducts.

Various changes may be made in the principles of my invention without departing from the spirit thereof as set forth in the description, drawing and claims.

I claim:

1. A lubricating device comprising a shaft having a longitudinal bore with ducts extending therefrom outwardly, bearings to be lubricated by the said ducts, a closure means for said ducts shiftable longitudinally in the bore and adapted to selectively open or close any one of the ducts to transmit grease only through the duct which is open, and means to flow grease through the said tube, the ducts and ports being different distances apart.

2. A lubricating device, comprising a shaft having a longitudinal bore with grease ducts extending from said bore outwardly and adapted to convey grease to bearings, a grease tube in the said bore and having ports to connect with the said ducts, and means to move the grease tube to selectively open and close any duct by registering one of the ports with said duct and removing the other ports out of register with the other ducts, and means to flow grease through the said tube, the ducts and ports being different distances apart.

3. A lubricating device comprising a shaft having a longitudinal bore with grease ducts extending outwardly therefrom, adapted to lubricate a plurality of bearings, a grease tube fitted in the bore and shiftable longitudinally, the tube having a plurality of ports, said ports being arranged whereby only one port can be in registry with one duct at a time, the said tube being shiftable to bring a port in alignment with any one duct and thereby selectively expel grease through the selected duct, and means to flow grease through the said tube, the ducts and ports being different distances a part.

4. A lubricating device as claimed in claim 3, means interconnecting with the tube and forming a stop to position the tube with designated ports in alignment with a designated duct.

5. A lubricating device, comprising a shaft having a longitudinal bore with a plurality of ducts leading from said bore outwardly, adapted to lubricate bearings, a grease tube slidably mounted in the said bore and having a plurality of ports, means to force grease longitudinally through the said tube and means to slide the said tube predetermined distances in and out of the said bore to selectively bring a port into registry with a particular duct, the ducts and ports being different distances apart.

6. A lubricating device as claimed in claim 5, means interconnecting the tube and the shaft to cause the rotation of such tube with the rotation of the shaft.

7. A lubricating device comprising in combination a rotatable shaft having a longitudinal bore with lateral ducts to the surface of the shaft, adapted to convey grease to bearings, a tube connected to a lubricant supply and slidable longitudinal in the bore and having a plurality of ports, a connection on the end of the tube to shift said tube longitudinally in the bore, and means interconnecting the shaft and the said shifting means to rotate the said tube with the shaft, the shifting of the tube being adapted to selectively register any desired port with any desired duct.

8. A lubricating device as claimed in claim 7, the said shaft having in addition a bleeder duct leading from the end of the bore to the surface of the shaft, adapted to convey surplus lubricant.

9. An oiling means for a shaft, comprising a rotary shaft having a central slidable tube connected to a lubricant supply and rotatable with the shaft, a plurality of ducts through the shaft from the tube to bearings to be greased, a plurality of ports through the tube, said ducts being adapted to register with the said ports on movement of the tube longitudinally of the said shaft, the ducts and ports being different distances apart, one port and one duct only registering at one time.

10. A lubricating device, comprising in combination a rotatable shaft having a longitudinal bore with ducts leading from said bore to the surface of the shaft and adapted to convey lubricant to bearings, a tube connected to a lubricant supply and longitudinally slidable in the said bore and having a plurality of ports, said ports being positioned whereby only one port can register at one time with a duct, a coupling secured to the end of the tube, pins secured to the shaft and engaging the coupling, whereby said coupling and tube are forced to rotate with the shaft.

11. A lubricating device comprising a shaft having a longitudinal bore, a plurality of bearings on the outside of the shaft, a duct leading from the said bore to each bearing, a grease tube slidably mounted in the said bore and having a plurality of ports, means to force grease longitudinally through the said tube, and means to slide the said tube predetermined distances in and out of the said bore to selectively bring a port into registry with a particular duct, the ducts and ports being different distances apart.

12. A lubricating device comprising a shaft having a longitudinal bore with a plurality of grease ducts extending outwardly from the bore and adapted to convey grease from each duct to a bearing, a grease tube in the bore and having ports, contiguous ports being spaced at different distance apart than the distance apart of contiguous ducts, the said tube extending beyond one end of the shafts and having a grease supply device connected thereto, and means to move the grease tube longitudinally of the said shaft to selectively register any port with one of the ducts and remove the other ports out of registry with the other duct.

13. A lubricating device comprising a rotatable shaft having a longitudinal bore, a plurality of ducts leading from said bore to the circumference of the shaft and each adapted to communicate with a bearing, a grease tube slidably mounted in said bore and having a plurality of ports, means to force grease longitudinally through the said tube, means to slide the tube predetermined distances in and out of the said bore to selectively bring a port into registry with a particular duct and all of the other ports out of registry with the ducts, and means to rotate said tube with the said shaft.

In testimony whereof I have signed my name to this specification.

CARL A. RUPP.